(No Model.)  5 Sheets—Sheet 1.

E. E. WITTER.
MACHINE FOR MAKING PICKET FENCES.

No. 389,784. Patented Sept. 18, 1888.

Witnesses
John F Nelson
H. T. Knight

Inventor.
Ezra E. Witter
By Knight &
Attorneys.

(No Model.) 5 Sheets—Sheet 3.

E. E. WITTER.
MACHINE FOR MAKING PICKET FENCES.

No. 389,784. Patented Sept. 18, 1888.

Witnesses.
John F. Nelson
H. T. Knight

Inventor.
Ezra E. Witter
By Knight Bros.
Attorneys.

(No Model.) 5 Sheets—Sheet 4.
E. E. WITTER.
MACHINE FOR MAKING PICKET FENCES.

No. 389,784. Patented Sept. 18, 1888.

Witnesses.
John F. Nelson.
H. F. Knight.

Inventor.
Ezra E. Witter
By Knight Bros.
Attorneys.

(No Model.) 5 Sheets—Sheet 5.
E. E. WITTER.
MACHINE FOR MAKING PICKET FENCES.
No. 389,784. Patented Sept. 18, 1888.
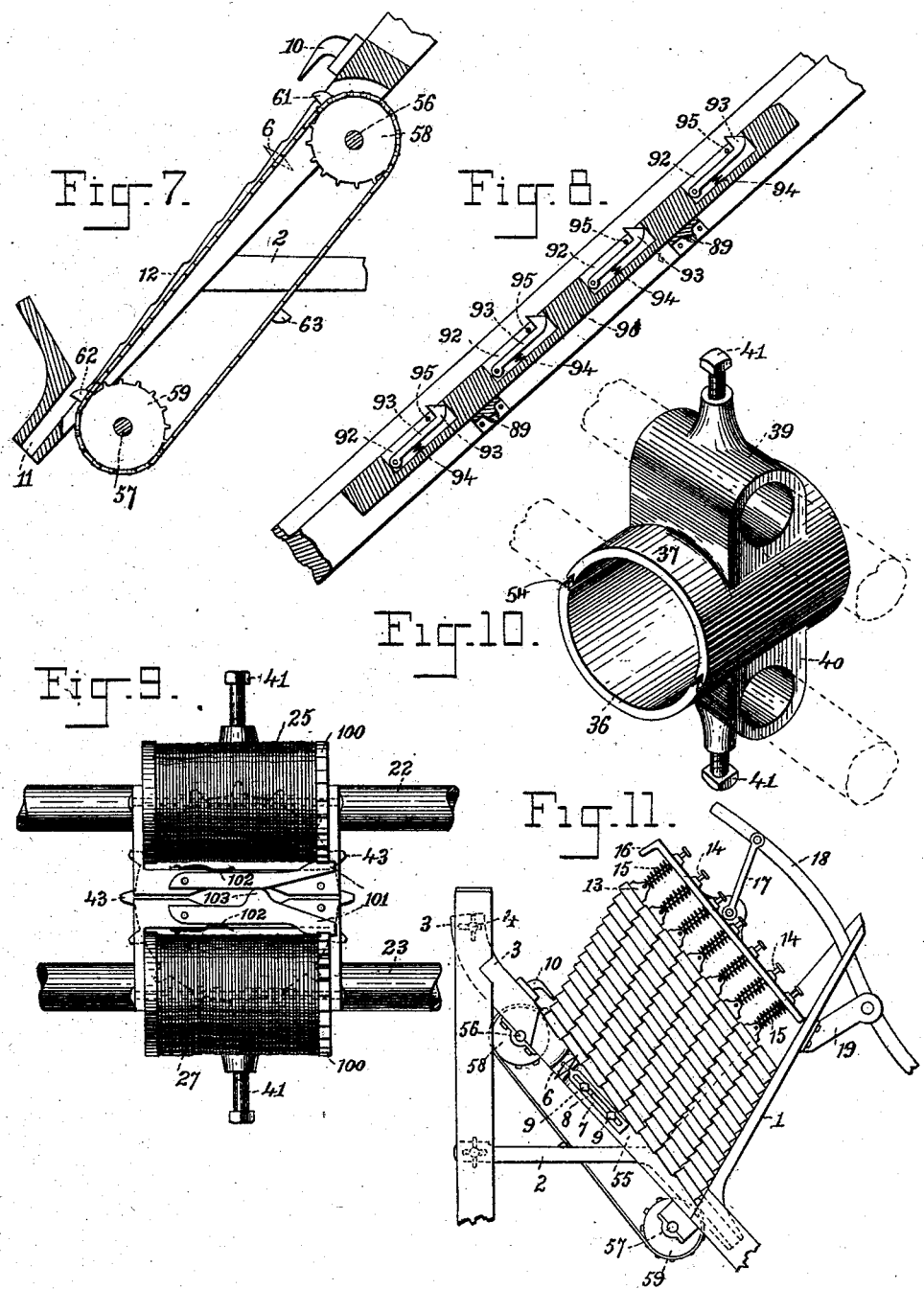

UNITED STATES PATENT OFFICE.

EZRA EDGAR WITTER, OF MILFORD CENTRE, OHIO, ASSIGNOR OF ONE-HALF TO ELIJAH M. WITTER, OF SAME PLACE.

MACHINE FOR MAKING PICKET FENCES.

SPECIFICATION forming part of Letters Patent No. 389,784, dated September 18, 1888.

Application filed December 16, 1887. Serial No. 258,121. (No model.)

*To all whom it may concern:*

Be it known that I, EZRA EDGAR WITTER, a citizen of the United States, residing at Milford Centre, in the county of Union and State of Ohio, have invented certain new and useful Improvements in Machines for Making Picket Fences, of which the following is a full, clear, and exact specification.

My invention relates to machines for making fences composed of pickets secured together by interweaving and twisting wire around and between them. Heretofore it has been the custom to feed the pickets into these machines endwise and one at a time, or else to cause them to be so fed by the employment of suitable mechanism, which necessarily makes the machine exceedingly complicated and expensive, in addition to rendering the operation slow and intricate.

The object of my invention therefore is to overcome these difficulties by automatically feeding the pickets sidewise or abreast into the machine from a hopper in which the pickets may be placed in large quantities.

My invention consists, essentially, in the twisting-wheels divided diametrically, which are mounted on the end of a similarly-divided cylinder carrying on each division a wire-spool for each of the semi twisting-wheels, said cylinder being journaled in a journal box or bearing, which is in like manner divided diametrically, and both sections of said journal box or bearing being secured to two frames, one of which may be stationary, but the other is adapted to be moved away from the former, carrying the semi twisting-wheel with one wire and its other parts with it, in order to permit the picket to slide edgewise from the hopper down between the said twisters and against the last twist in the wires.

My invention also consists in various other features of novelty, which I will now describe with reference to the accompanying drawings, and then point out specifically in the claims hereto annexed.

Figure 1:
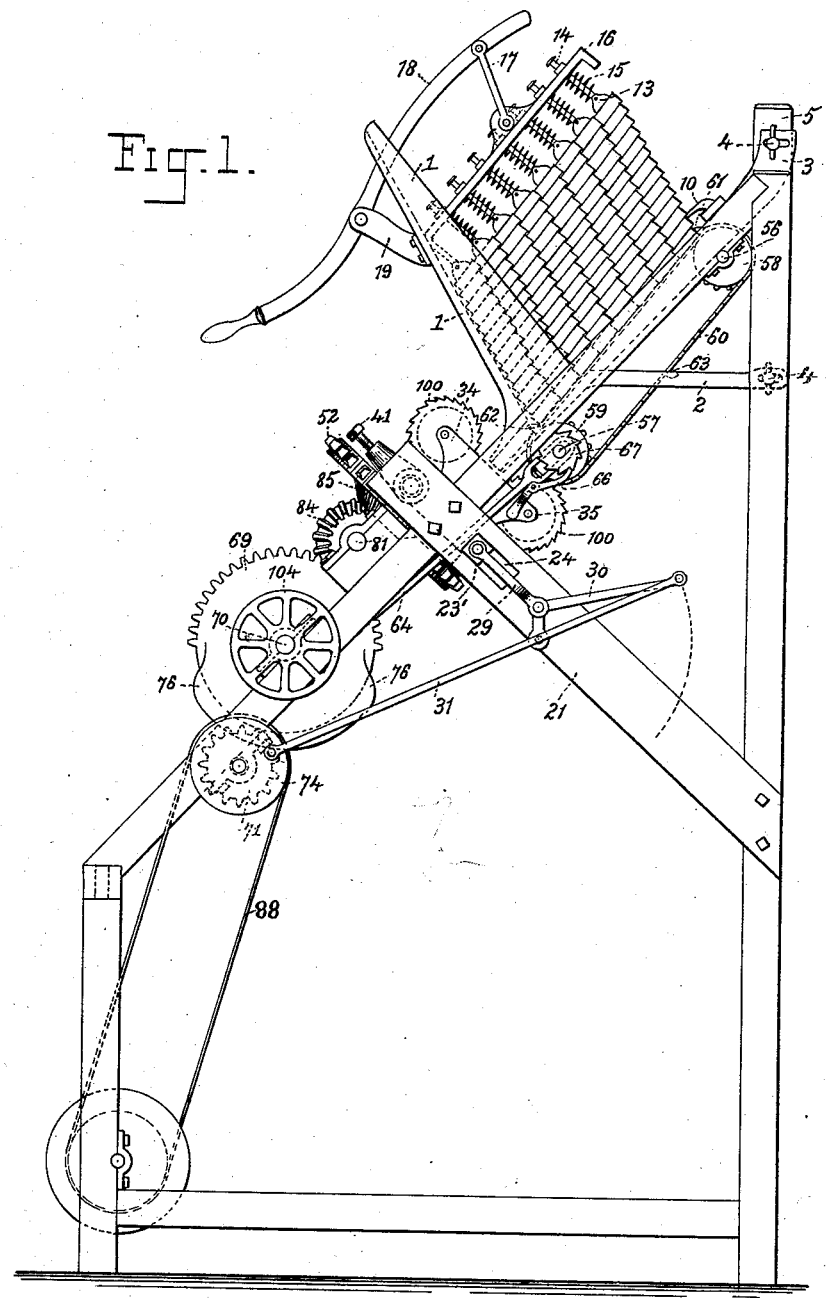
Figure 2:
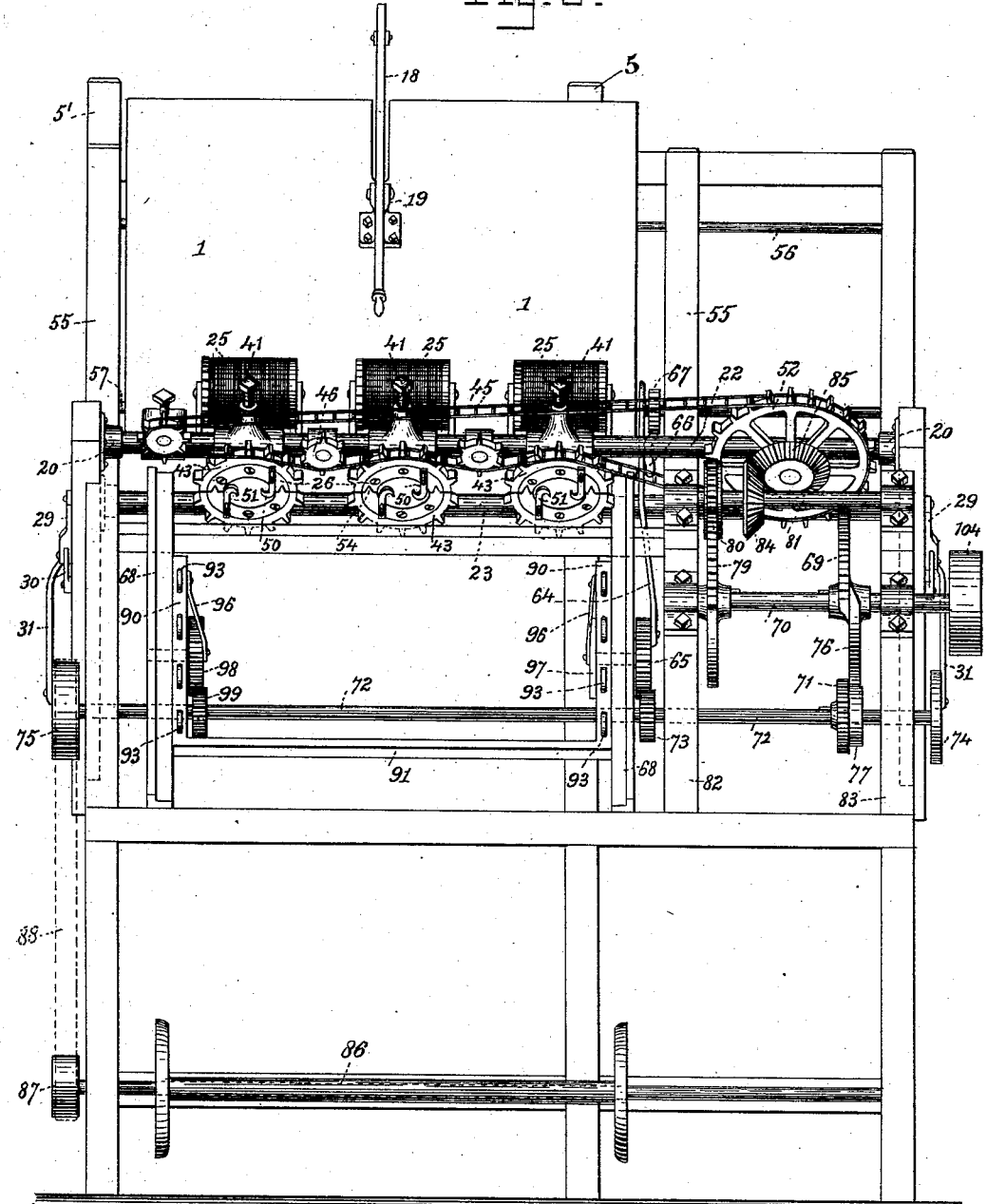
Figure 3:
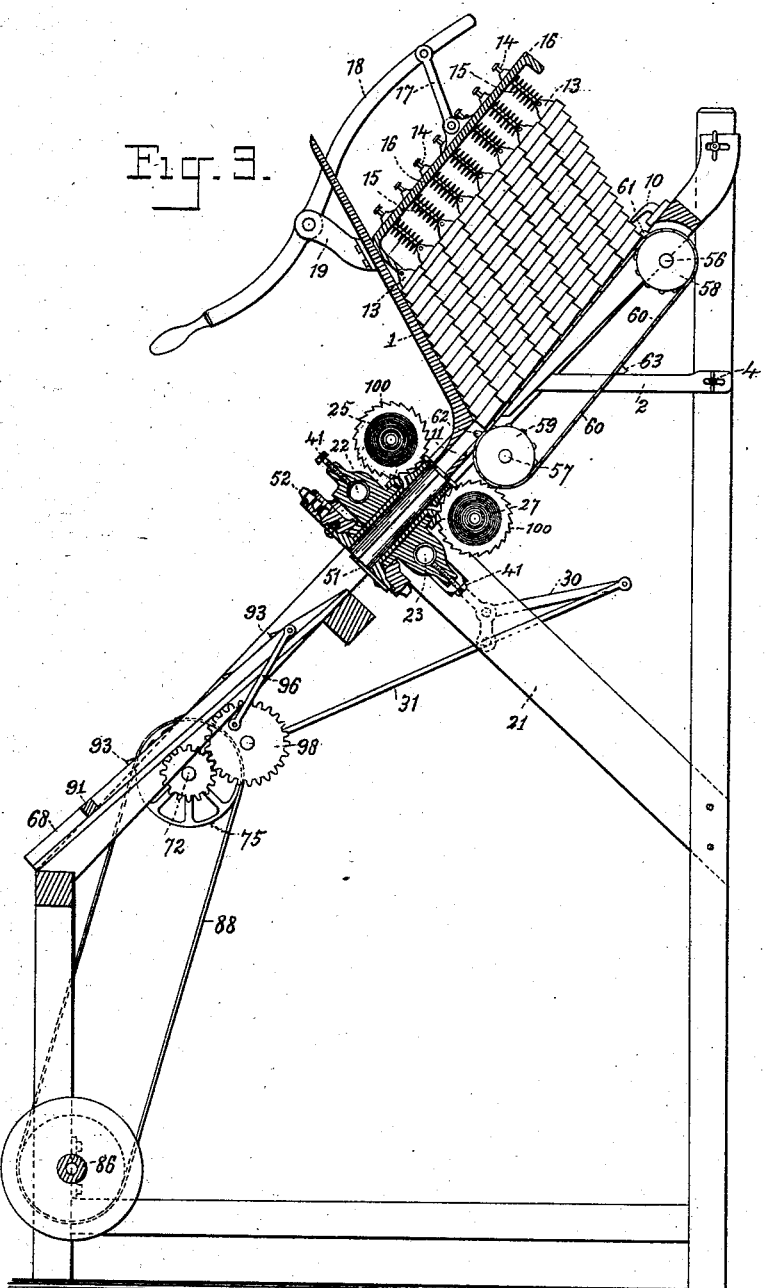
Figure 4:
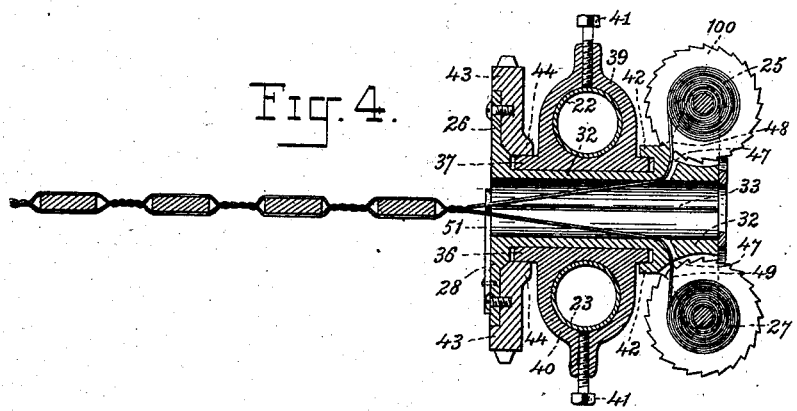
Figure 5:
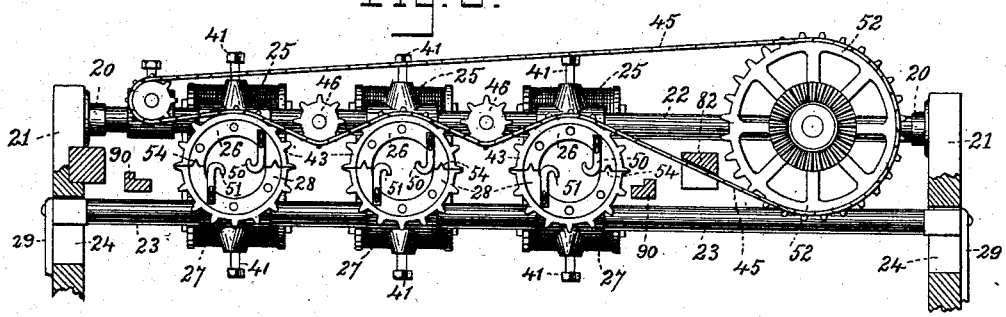
Figure 6:
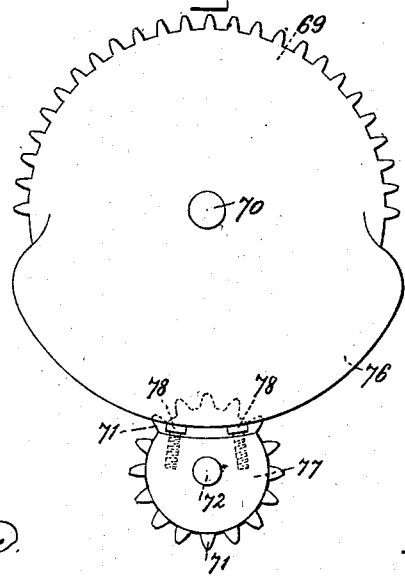

In the accompanying drawings, Figure 1 is a side elevation of the machine. Fig. 2 is a front view of the machine. Fig. 3 is a vertical section of the machine, taken on a line passing through one of the twisters. Fig. 4 is an enlarged vertical sectional view of one of the twisting-wheels, the wire-spools, and the supporting parts, also showing a portion of the finished fence. Fig. 5 is a front elevation of the twisting-wheels, showing the supporting-frames and the manner of imparting motion to said wheels. Fig. 6 is an enlarged detail view. Fig. 7 is an enlarged detail view of the hopper, flooring, and the mechanism for advancing the pickets. Fig. 8 is an enlarged detail sectional view. Fig. 9 is an enlarged rear view of the wire-spools. Fig. 10 is a detail perspective view. Fig. 11 is a view of the opposite end of the hopper to that shown in Fig. 1.

The hopper 1 is secured to the frame of the machine above the twisting mechanism by means of the arms 2 3, which are provided with slots, through which set-screws 4 are driven into the upright pieces 5 5', whereby the adjustment of said hopper is facilitated. This hopper is adapted to receive a whole bundle of pickets at a time, which is pushed into the hopper at one end over a disk-knife, 6, which is journaled on the end of the plate 7, adjustably secured to the side of the inclined beam 55 by means of the slot 8 and screws 9, which knife cuts the binding cords or wires of the bundle as they pass over it, and the wires after being cut are dragged away from the bundle by means of the hook 10, which is also adjustably secured to the top side of the same beam by means of the screw and slot, as shown.

In order to prevent the edges of the bottom layer of pickets from catching against one another, and to insure against the said layer slipping out through the hopper-mouth 11 before the advancing mechanism (hereinafter described) is caused to operate for that purpose, I provide the flooring of the hopper with longitudinal corrugations 12, which extend throughout the length of the hopper, and each of which is as wide as the picket. These corrugations slope upward, so as to hold the lower edge of the picket below the upper edge of the picket just above it. To further insure the retention of the pickets until the proper time for delivery, I provide a number of followers, 13, each of which is pivoted at both ends to the lower ends of the pins 14 and rests upon the single tier of pickets directly under it, the said followers being held down independently by the spiral springs 15, surrounding the pins 14. These pins pass through the upper follower or board, 16, which rests upon the said springs, and has attached to it by means of a link, 17, a lever, 18, which latter is fulcrumed to a bracket, 19, on the hopper and projects through a slot in the side of the hopper, and is for the purpose of affording means for elevating the follower when it is desired to insert a new bundle of pickets.

Extending athwart the machine and secured in the sockets 20 to the slanting beams 21 is a rod, 22, which is preferably composed of iron tubing, and below this in the same oblique plane with the beams 21 is a similar rod, 23; but the latter is slightly longer than the rod 22 and projects through slots 24 in the beams 21. These rods constitute the movable and stationary frames hereinbefore mentioned. The upper one has suspended from it the upper spools, 25, and the semi twisting-wheels 26, and the lower one has mounted upon it the lower spools, 27, and semi twisting-wheels 28. The lower rod, 23, is supported at each end by a link, 29, which in turn is supported by being pivoted to the elbow of a bell-crank lever, 30, having a long and a short arm, the latter being pivoted to the beam 21, and the former to a pitman, 31, whereby the lower rod, together with the lower halves of the twisting-wheels and other attached parts, may be lowered to allow the picket to slide through between the twisters, the rod being guided in its up-and-down motion by the slots 24, which are preferably faced with steel or some hard bearing-surface, in order to prevent the square blocks 23' on the ends of the rod, which slide perpendicularly in said slots, from wearing and becoming loose. The construction of these twisters and the manner in which they are mounted on the frames are best shown in Figs. 4, 5, and 10.

The twisting-wheel, as before said, is formed of two semi-wheels, 26 28, which are made integral with a cylinder, 32, which is also diametrically divided at 33 to correspond with the divisions of the wheel, (for convenience, it may here be stated that all of these parts are divided laterally in order to permit the lower halves to be lowered, as before described, and the two divisions are identical in the number of parts as well as proportions,) and at the rear end of this cylinder is made integral with each of its sections a fork or two brackets, 34 35, in which are journaled the upper and lower wire-spools, 25 27. 36 37 are semicircular bands which compose a journal box or bearing which surrounds the cylinder 32, as shown, and permits the same to revolve therein, and these bands 36 37 have enlarged portions 39 40, respectively, through which pass the tubular bars 22 23, respectively, and thus support the twisters, the said enlargements being provided with set-screws 41, which are employed for clamping the twisters at any desired distance from each other on the bars. In order to prevent the parts from separating when the lower halves are lowered I provide the rear end of the divided cylinder 32 with an annular flange, 42, which overlaps a portion of the said journal box or bearing at one end, and I provide the divided sprocket-wheel 43 with a hub, which forms an overhanging annular flange, 44, that covers a portion of the other end of said sleeve. This sprocket-wheel 43 is bolted to the semi twisting-wheels 26 28 in the manner shown in Fig. 4 of the drawings, and it serves to impart a revolving motion to said twisters and the cylinder 32 from the sprocket-chain 45, which latter is held in contact with the upper halves only of the wheels 43 by means of the idle deflecting-wheels 46, which are adjustably collared to the stationary bar 22, as shown. Each half of the cylinder 32 is provided with an oblique duct, 47, through which the wire strands 48 49 enter the said cylinder and pass out through the twisting-hooks 50 51, which are adjustably secured to the faces of the semi-wheels 26 28, respectively. In order to insure the exact fit of the cylindrical parts when they are brought together preparatory to making the twist I provide the lower halves of all the parts with inverted-V-shaped dowels 54, and the upper halves with complementary V-shaped sockets, into which said dowels fit and secure said parts against displacement.

From the description thus given it will be seen that when the sections are brought together so as to form an integer, and the large sprocket-wheel 52 is revolved, the divided wheels 43 will also be revolved, and will cause the semi-cylinders to revolve in the collar formed by the bands 36 37, carrying the spools with it the same as if they were made integral, and as the picket 53 is incapable of revolving with these parts a twist is formed in the wires between the twisting-hooks and said picket.

The mechanism of this machine may properly be divided into two divisions—namely, the "advancing" and the "twisting" mechanisms—and the operation of these two mechanisms is necessarily intermittent—that is, one is at rest while the other is in operation—and as the operation of the former necessarily precedes the twisting operation, I will proceed to describe it first. Extending athwart the machine and journaled to the inclined members 55 are two shafts, 56 57, upon each of which and under each end of the hopper 1 is mounted and keyed thereto a sprocket-wheel, 58 59, around each pair of which is rove a sprocket-chain, 60, which carries three lugs, 61 62 63, which latter project up through a slot in the hopper-bottom and come in contact with the lower layer of pickets to push them forward the space of one picket at a time when the chain is put in motion by the mechanism presently to be described. These lugs are so located on the chain that when one of them has passed from under the bundle another will be in position, as at 61, to push the layer forward without delay. This chain is moved forward the distance of one picket at a time by means of a pitman, 64, which is pivoted eccentrically to a cog-wheel, 65, at one end, and is provided with a suitable pawl, 66, at the other, which engages at every revolution of said cog 65 with a ratchet-wheel, 67, on the shaft 57, whose teeth are of such a distance apart and so arranged relative to the pawl that the wheel 59 will be revolved just sufficiently to carry the chain forward the proper distance to push one picket from under the bundle, which falls by gravity through the hopper-mouth and slides down the incline track-rails 68 through the twisters and between the wires as far as the twist last made. The upper and lower twisters are of course supposed to be separated, as before described, when this operation takes place. The motion thus given to the advancing mechanism is caused by the intermittent gear-wheel 69, which is keyed to the main driving-shaft 70, coming in contact and meshing with the pinion 71 on the shaft 72, which revolves said shaft, and also revolves the cog 65 by virtue of the latter's engagement with the pinion 73. This action also causes the lower halves of the twisters to slowly rise to their places by reason of the pitman-rods 31 being eccentrically pivoted to the disk 74 on one end of the shaft 72 and the band-wheel 75 on the other end, and by the time the cogs on the wheel 69 have passed the pinion 71 the lower halves of the twisters will be entirely elevated and the plain portion 76 of said wheel will have revolved into contact with a chock on the wheel 77, which will prevent the shaft 72 from making any further revolution, and consequently hold the lower halves of the twisters rigidly against the upper ones. This chock, before mentioned, is formed by cutting a portion of the periphery of the wheel 77 away and driving set-screw 78 into the mutilated portion. I prefer to use screws for this purpose, because the friction produced by the revolution of the plain portion 76 is so great that the parts soon wear, and with the screws they can be kept in contact. This chock allows the wheel 69 to revolve, however, with the shaft 70. A second intermittent gear-wheel, 79, after the wheel 69 has done its work, begins to engage a pinion, 80, keyed to a shaft, 81, which is journaled in the inclined numbers 82 83 of the frame. This shaft 81 also has keyed to it a bevel gear-wheel, 84, which engages with a bevel gear-wheel, 85, secured to the large sprocket-wheel 52, which puts the latter in motion, and consequently revolves the twisters, which produce the desired number of twists in the wires. Supposing the cogs of the wheel 79 to have passed the pinion 80, the plain portion 76 of the wheel 69 will have disengaged the chock in the wheel 77, and the teeth of the wheel 69 will now be ready to again engage the pinion 71, which in revolving will lower the lower halves of the twisters, advance another picket from the hopper, as before described, revolve the reel 86, upon which the finished fence is wound, by virtue of the wheel 87 on the shaft of the latter being connected with the band-wheel 75 by a band, 88, and will impart a reciprocating motion to mechanism for advancing the finished fence, and to which mechanism it is now in order to refer. Secured to the inner sides of the guide-rails are small brackets 89, upon which strips 90 rest and slide. These strips are connected by a cross-bar, 91, and their upper faces are flush with the supporting-faces of the guide-rails 68; but the faces of the former are provided with cavities 92, Fig. 8, in which are pivoted hooks 93, having their upper ends beveled, as shown, so as to enable them to be depressed below the surface of the strips 90 when it moves toward the twisters, the hooks being held normally protruded and their upper movement limited by springs 94 and pins 95, respectively. Pivoted to each of these strips 90 is a pitman, 96, one of which is eccentrically pivoted to a disk, 97, on the same shaft with the wheel 65, and the other is similarly connected to a cog, 98, which derives its motion from a pinion, 99, on the shaft 72, and thus it will be seen that when the shaft 72 is revolved the strips 90 will be reciprocated, sliding ineffectually under the finished fence on its upward stroke, and bringing the fence with it upon its downward stroke. When the picket falls through, it catches upon one of these hooks 93, and is thus held against upward movement while the twisters are at work. In order to prevent the wires from paying out while the twist is being made, I provide one end of each spool with ratchet-teeth 100, and to the rear of the cylinder 32, I pivot to each section a pawl or dog, 101, against each of which a blade-spring, 102, bears for the purpose of holding said pawls together and away from the ratchets. The lower pawl or dog, however, is provided with a boss, 103, which, when the lower half of the twister is brought up into contact with the upper one, strikes against the upper pawl, forcing it upward in engagement with the upper ratchet, and also forces the lower pawl into engagement with the lower ratchet in a like manner, and thus preventing the revolution of the spools and the consequent paying out of the wire while the twisters are together and at work.

The gear 69 is in such proportion to the pinion 71 as to cause the lower halves of the twisters to go down and come up into place again while the said gears are in engagement, and, in fact, all of the parts are so proportioned that they will move in perfect harmony with each other.

Power may be imparted to the machine by a belt applied to the wheel 104, or by any other suitable means.

Having described my invention, the following is what I claim as new and desire to secure by Letters Patent:

1. The combination of the divided twister, a divided axle on which said twister is mounted, and a divided journal box or bearing for said axle, substantially as set forth.

2. The combination of the divided twister, a divided axle on which said twister is mounted, a divided journal box or bearing for said axle, and separable frames on which said journal is mounted, substantially as set forth.

3. The combination of the divided twister, a hollow divided axle on which said twister is mounted, a spool on each division of said axle, a divided journal box or bearing for said axle, and separable frames upon which said journal is mounted, substantially as set forth.

4. The combination of a hollow divided shaft, a hook and a spool on each division of said shaft, a divided journal box or bearing for said shaft, and a stationary and removable frame to which the divisions of said journal-box are secured, respectively, substantially as set forth.

5. The combination of a hollow divided shaft, a hook and a spool at opposite ends of said shaft and on each division, a divided journal-box in which said shaft is journaled, flanges on said shaft overlapping the ends of said journal-box, and separable frames to which the divisions of said journal-box are secured, substantially as set forth.

6. The combination, with the divided twisting device, of a spool mounted on each division, ratchet teeth on said spools, and pawls for engaging said teeth when the said divisions are brought together, substantially as set forth.

7. The combination, with the divided twisting device having a spool on each division, of a ratchet-wheel on each spool, a pawl pivoted to each of said divisions, springs for holding said pawls together, and a boss on one or both of said pawls for forcing them apart when the divisions of said twisting device are brought together, substantially as set forth.

8. The combination of the hollow divided cylinder 32, having a hook and a spool at opposite ends of each division, and the ducts 47, the divided journal-box surrounding said cylinder, the flange 42, and a semi sprocket or gear wheel secured to each division of said cylinder, substantially as set forth.

9. The combination of the divided twisters, divided sprocket-wheels 43, secured to the twisters for revolving the latter, and a revoluble chain or belt adapted to contact with a portion of the periphery of said wheels, substantially as set forth.

10. The combination, with the movable and stationary sections of the twisters, of the movable and stationary sections of the wheels 43, secured, respectively, to the sections of the twisters, and a chain or belt held in contact with the stationary sections of the said wheels by suitable deflecting devices, substantially as set forth.

11. The combination, with the divided twisting devices, of the stationary bar 22 and the movable bar 23, to which the division of said devices are secured, a pivoted bell-crank attached to the bar 23 and to a crank, 74, and the intermittent gear for operating said crank 74 at the proper time, substantially as set forth.

12. The combination, with the bar 23, having suitable guides, of pivoted bell-cranks attached to said bar, cranks 74 75, connected with said bell-cranks, shaft 72, on which cranks 74 75 are keyed, power-shaft 70, a mutilated gear-wheel on said shaft, a pinion on shaft 72, for engaging with said gear, the plain wheel 77, having a mutilated periphery, and the plain portion 76, for engaging in said mutilation, substantially as set forth.

13. The combination of a hopper having a corrugated bottom for containing pickets in tiers and followers for resting upon the tiers, substantially as and for the purposes set forth.

14. The combination, with a hopper for containing pickets in tiers, of a follower having supplemental followers, substantially as shown, and for the purpose set forth.

15. The combination, with a hopper for containing pickets in tiers, of a follower having a supplemental follower for each tier of pickets, and springs for pressing said supplemental followers in contact with the pickets, substantially as set forth.

16. The combination, with the hopper, of the shafts 56 57, wheels 58 59, mounted on said shafts below said hopper, chains or belts on said wheels, lugs 61 62 63 on said belts, a ratchet-wheel on one of said shafts, and a pawl for engaging with said ratchet, whereby the chains are set in motion, substantially as set forth.

17. The combination, with the hopper, of a knife arranged in or on said hopper for severing the binding-cords of the pickets, substantially as set forth.

18. The combination, with the hopper adapted to receive bundles of pickets longitudinally, of a disk-knife arranged in or near said hopper for cutting the binding-cords of the bundle and a hook secured in proximity to said hopper, so as to drag said cords from the bundle, substantially as set forth.

19. In the reciprocating advancing mechanism for the fence, the strips 90, having countersunk flexible hooks, substantially as set forth.

20. In the advancing mechanism, the combination, with the brackets 89 and the strips 90, adapted to slide thereon and having cavities therein, of hooks pivoted in said cavities, cushions or springs for holding said hooks elevated, and a stop for limiting the upward movement of said hooks, substantially as set forth.

21. The combination, with the shaft 70, having intermittent gear for operating the twisting mechanism, and the shaft 72, having a pinion for operating the advancing mechanism, of the mutilated gear 69, having plain portion 76 on shaft 70, a pinion, 71, on shaft 72, for engaging with said gear, and a wheel, 77, on the latter shaft, having a mutilated periphery, in which said plain portion 76 engages, as set forth.

22. In a fence-building machine, the combination of the divided twister-wheels, the inclined hopper-bottom, constructed substantially as shown and described, and the endless belts provided with lugs, the under chute-board or hopper-bottom being zigzagged or corrugated on its upper face, whereby the pickets are kept at positions out of parallel with the plane of the face of the said under chute-board or hopper-bottom.

23. The combination, in a fence-building machine, of the divided twister-wheels, the supporting-frame and divided shafts on which said wheels are mounted, and means, substantially as described, to move one section of said frame from the other section, so as to separate the two sets of semi-wheels and shafts from each other, substantially as and for the purposes set forth.

24. In a fence-building machine, the combination of a hopper for containing pickets, having a corrugated or zigzag under chute board or bottom, and a follower arranged above the pickets and provided with zigzagged faces on its lower side to correspond with the upper face of the under chute board or bottom, substantially as shown and described.

25. In a fence-building machine, the combination of a hopper having an inclined chute-board provided with a zigzag face, as described, and the slots arranged in the frame of said chute-board, and the binding-screws which extend through said slots and into the main frame of the machine, whereby the said chute-board can be adjusted or shifted, substantially as shown and described.

26. In a fence-building machine, the combination of the hopper consisting of the inclined chute-board, constituting one part of said hopper, and the slanting board against which the edges of the pickets rest, constituting the other part, with a follower having separate pieces arranged upon sockets and provided with springs to give a uniform pressure, one of the aforesaid pieces being provided for each pile or tier of pickets, substantially as shown and described.

EZRA EDGAR WITTER.

Witnesses:
J. W. TILTON,
J. S. BOERGER.